United States Patent
Takahashi et al.

(10) Patent No.: US 9,429,722 B2
(45) Date of Patent: Aug. 30, 2016

(54) OPTICAL CONNECTOR AND OPTICAL TRANSMISSION MODULE

(71) Applicants: Kyocera Corporation, Kyoto (JP); KYOCERA CONNECTOR PRODUCTS CORPORATION, Kanagawa (JP)

(72) Inventors: Naoki Takahashi, Kanagawa (JP); Kazumi Nakazuru, Kanagawa (JP); Takahiro Matsubara, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 14/646,766

(22) PCT Filed: Sep. 30, 2013

(86) PCT No.: PCT/JP2013/076606
§ 371 (c)(1),
(2) Date: May 22, 2015

(87) PCT Pub. No.: WO2014/080694
PCT Pub. Date: May 30, 2014

(65) Prior Publication Data
US 2015/0316731 A1   Nov. 5, 2015

(30) Foreign Application Priority Data
Nov. 22, 2012 (JP) .................. 2012-256602

(51) Int. Cl.
*G02B 6/38* (2006.01)
*G02B 6/30* (2006.01)
(52) U.S. Cl.
CPC ........... *G02B 6/3893* (2013.01); *G02B 6/3885* (2013.01); *G02B 6/3897* (2013.01); *G02B 6/30* (2013.01)

(58) Field of Classification Search
CPC G02B 6/3893; G02B 6/3885; G02B 6/3897; G02B 6/30
See application file for complete search history.

(56) References Cited

U.S. PATENT DOCUMENTS

| 4,405,201 | A * | 9/1983 | Cefarelli | G02B 6/383 385/59 |
| 7,059,780 | B2 * | 6/2006 | Yamabayashi | G02B 6/4215 385/88 |
| 7,093,982 | B1 * | 8/2006 | Hildebrandt | G02B 6/3885 385/137 |

(Continued)

FOREIGN PATENT DOCUMENTS

| JP | H1-86175 | 6/1989 |
| JP | 11119057 A | 4/1999 |

(Continued)

OTHER PUBLICATIONS

Publication dated May 30, 2014 and International Search Report dated Oct. 29, 2013, from related International Patent Application No. PCT/JP2013/076606.

*Primary Examiner* — Peter Radkowski
(74) *Attorney, Agent, or Firm* — Duane Morris LLP

(57) ABSTRACT

The optical connector has the receptacle which is fastened to the board provided with the optical waveguides and has the plug which holds the optical fibers and is connected to the receptacle. The receptacle has the positioning member which positions the optical fibers to the optical waveguides to connect them optically by abutment against the plug and has the fastening member which is fastened to the board and fastens the positioning member to the optical waveguides.

13 Claims, 9 Drawing Sheets

(56) References Cited

U.S. PATENT DOCUMENTS

| | | | | |
|---|---|---|---|---|
| 7,384,202 | B2* | 6/2008 | Nagasaka | G02B 6/4214 385/137 |
| 7,488,115 | B2* | 2/2009 | Theis | G02B 6/3825 385/55 |
| 7,513,697 | B2* | 4/2009 | Harano | G02B 6/4292 385/88 |
| 7,513,699 | B2* | 4/2009 | Matsumoto | G02B 6/421 385/53 |
| 2002/0168153 | A1* | 11/2002 | Yamabayashi | G02B 6/4215 385/88 |
| 2006/0274998 | A1* | 12/2006 | Ito | G02B 6/4292 385/92 |
| 2007/0177844 | A1* | 8/2007 | Nagasaka | G02B 6/4214 385/89 |
| 2007/0183723 | A1* | 8/2007 | Matsumoto | G02B 6/4292 385/88 |
| 2008/0085082 | A1* | 4/2008 | Theis | G02B 6/3893 385/72 |
| 2008/0205826 | A1* | 8/2008 | Harano | G02B 6/4292 385/88 |

FOREIGN PATENT DOCUMENTS

| | | | |
|---|---|---|---|
| JP | 11326701 | A * | 11/1999 |
| JP | 2000-275464 | A | 10/2000 |
| JP | 2007133225 | A * | 5/2007 |
| JP | 2007192933 | A * | 8/2007 |
| JP | 2008-137108 | A | 6/2008 |
| JP | 2011-075688 | A | 4/2011 |
| JP | 2011075688 | A * | 4/2011 |

* cited by examiner

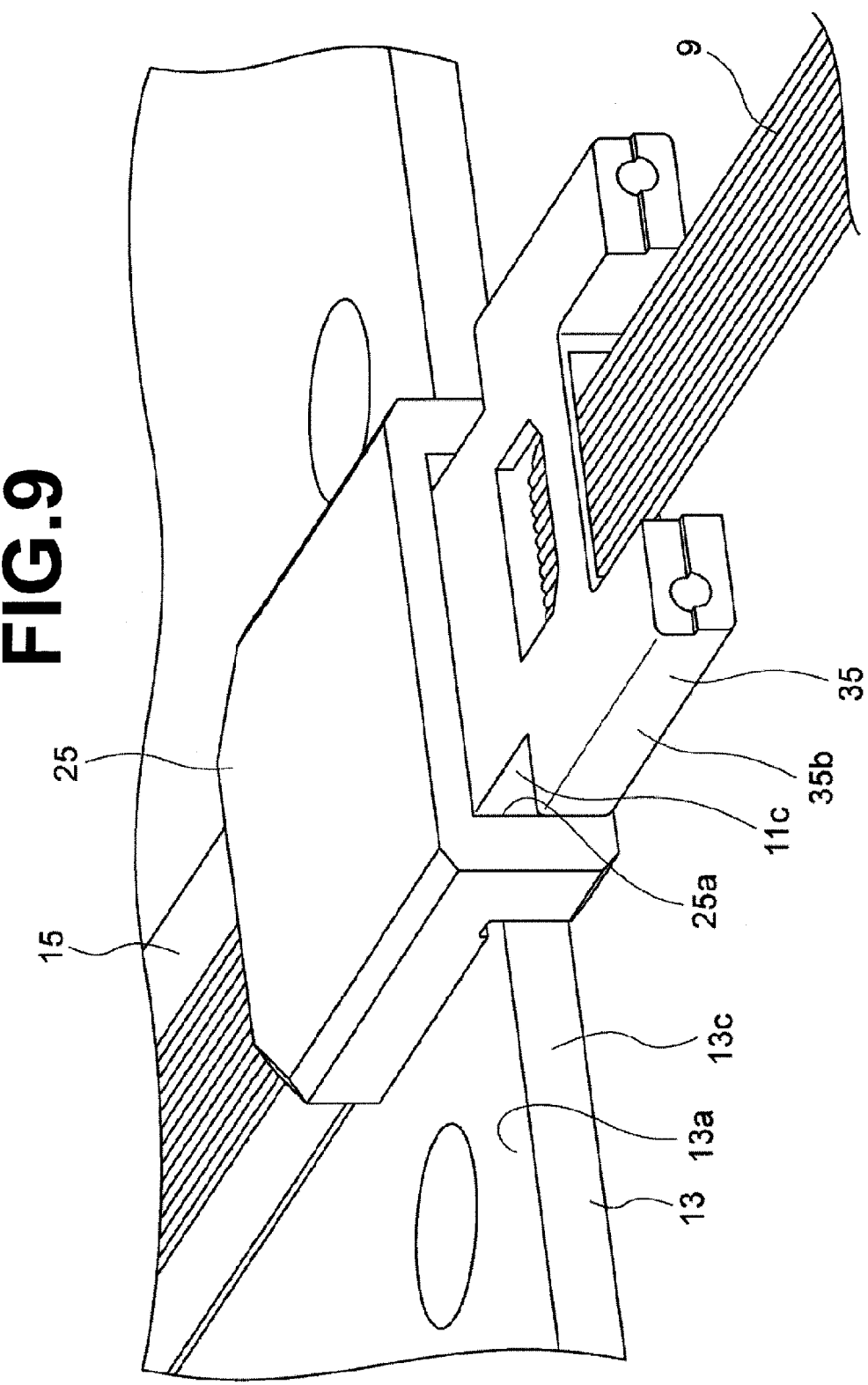

US 9,429,722 B2

OPTICAL CONNECTOR AND OPTICAL TRANSMISSION MODULE

REFERENCE TO RELATED APPLICATIONS

This application is a 35 U.S.C. §371 U.S. National Phase application of PCT/JP2013/076606, which was filed on Sep. 30, 2013, which claims priority to Japanese Patent Application No. 2012-256602 filed on Nov. 22, 2012. The disclosures of these applications are incorporated herein by reference in their entireties.

TECHNICAL FIELD

The present invention relates to an optical connector for connecting transmission lines of light to each other and an optical transmission module which includes the optical connector.

BACKGROUND ART

Known in the art is an optical connector for connecting optical transmission lines to each other. For example, the optical connector which is disclosed in Patent Literature 1 positions a first connector part which holds an optical transmission line constituted by a first optical cable and a second optical connector which holds an optical transmission line constituted by a second optical cable so as to make an end part of the first optical cable and an end part of the second optical cable abut against each other to position them and in turn connect these optical cables.

The art disclosed in Patent Literature 1 connects optical cables to each other. However, sometimes it is desired to connect optical waveguides which are provided on a board and an optical cable. In this case, it may be considered to position the first connector part which is fastened to the board and the second connector part which holds the optical cable relative to each other to thereby position the optical waveguides of the board and the optical cable and to connect these.

Here, for example, if trying to make a firmly fasten the first connector part to the board or to facilitate the attachment, the first connector part becomes large in size. However, for example, it is difficult to mold a large-sized first connector part with a high accuracy, and the thermal deformation of the large-sized first connector part is large. As a result, the first connector part and the second connector part cannot be positioned with a high accuracy and in turn it becomes difficult to position the waveguides of the board and the optical cable with a high accuracy.

Accordingly, an optical connector and an optical transmission module which are capable of achieving both suitable fastening of the connector part to the board and high precision positioning of the optical transmission line are desirably provided.

CITATIONS LIST

Patent Literature 1: Japanese Patent Publication No. 2000-275464A.

SUMMARY OF INVENTION

An optical connector according to one aspect of the present invention has a first connector part which is fastened to a base provided with a first optical transmission line, and a second connector part which holds a second optical transmission line and is connected to the first connector part. The first connector part has a positioning member which is arranged on the first optical transmission line and performs positioning so that the second optical transmission line is optically connected to the first optical transmission line by the second connector part contacting it, and a fastening member which is fastened to the base and fastens the positioning member with respect to the first optical transmission line.

Further, an optical transmission module according to one aspect of the present invention has a first optical transmission line, a base which is provided with the first optical transmission line, a second optical transmission line, a first connector part which is fastened to the base, and a second connector part which holds the second optical transmission line and is connected to the first connector part. The first connector part has a positioning member which is arranged on the first optical transmission line and performs positioning so that the second optical transmission line is optically connected to the first optical transmission line by the second connector part contacting it, and a fastening member which is fastened to the base and fastens the positioning member with respect to the first optical transmission line.

According to the above configuration, a suitable fastening of the connector part to the board and a high precise positioning of the optical transmission line can be made consistent.

BRIEF DESCRIPTION OF DRAWINGS

FIG. 9 is a perspective view which shows the positioning member and a positionable member of the optical transmission module in FIG. 1 in a connected state.

DESCRIPTION OF EMBODIMENTS

Figure 1:
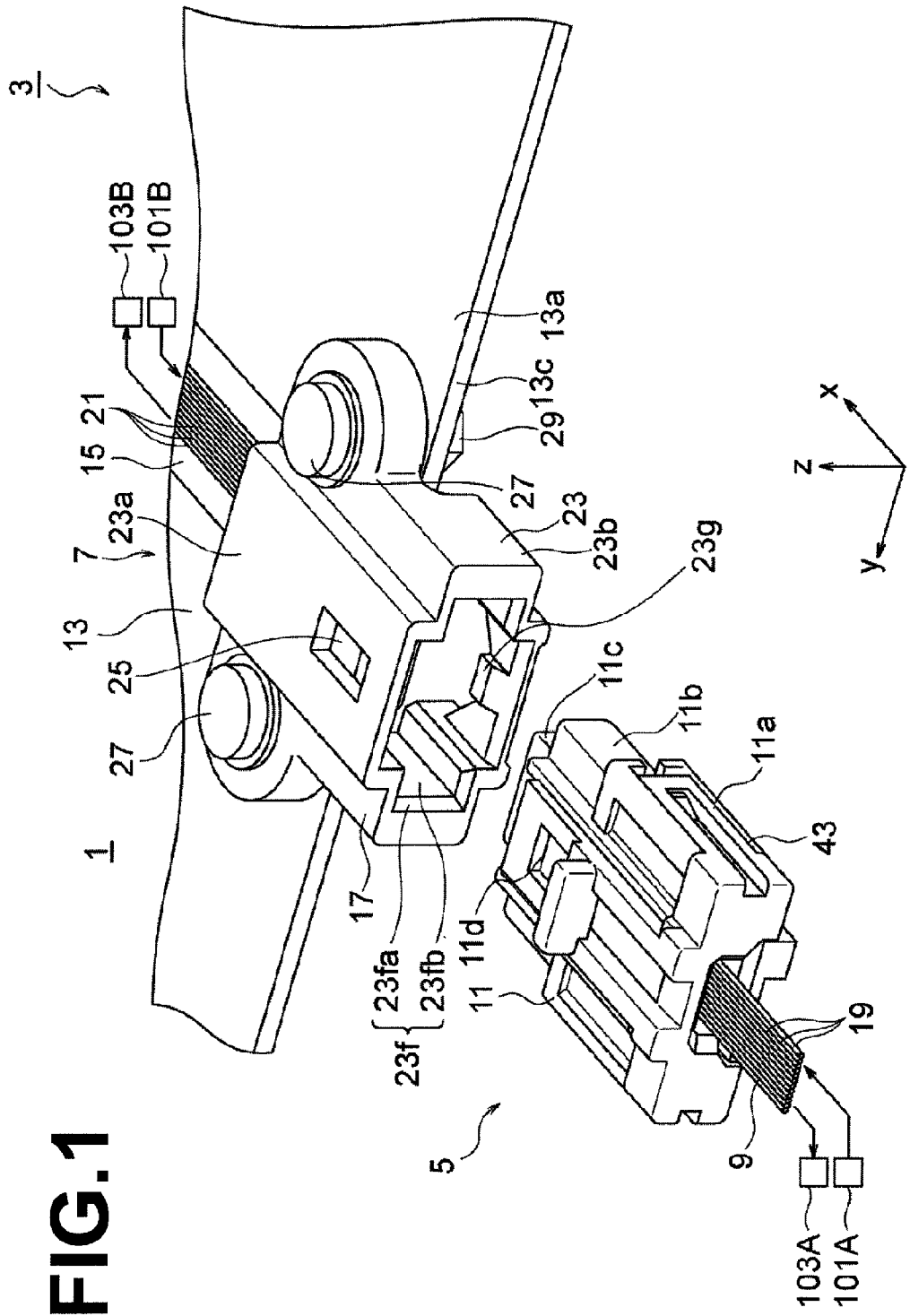
FIG. 1 is a perspective view which shows an optical transmission module and an optical connector according to an embodiment of the present invention in a non-connected state.

FIG. 1 is a perspective view which shows an optical connector 3 and an optical transmission module 1 which includes the optical connector 3 according to an embodiment of the present invention in a non-connected state.

Note that the optical connector 3 and the optical transmission module 1 may be used with either direction designated as "upward" or "downward". However, in the following explanation, for convenience, an orthogonal coordinate system xyz will be defined, the positive side of a z-direction will be defined as "upward", and terms such as the "upper surface" or "lower surface" will be used.

The optical transmission module 1 has a plug assembly 5 and a receptacle assembly 7 which is connected to the plug assembly 5.

The plug assembly 5 has an optical cable 9 and a plug 11 which holds one end of the optical cable 9. To the other end of the optical cable 9, for example, a light emitting element 101A and a light receiving element 103A are connected.

The receptacle assembly 7 has a board 13, an optical waveguide strip 15 which is provided on the board 13, and a receptacle 17 which is fastened to the board 13 and is positioned on one end of the optical waveguide strip 15. To the other end of the optical waveguide strip 15, for example, a light emitting element 101B and light receiving element 103B are connected.

By insertion of the plug 11 into the receptacle 17, the two are positioned relative to each other. Due to this, the optical cable 9 and the optical waveguide strip 15 are connected positioned in a state made to abut against each other (end faces are made to face each other and are made to approach or contact each other). Consequently, the light emitting element 101A and the light receiving element 103B are optically connected, and the light emitting element 101B and the light receiving element 103A are optically connected.

Note that, the optical connector 3 is configured by the plug 11 and receptacle 17. The dimensions of the optical connector 3 may be suitably set. However, for example, one side of the outer shape of the plug 11 or receptacle 17 is about a several millimeters.

Further, the light emitting element 101A, light receiving element 103A, light emitting element 101B, and light receiving element 103B may be grasped as portions of the optical transmission module 1 as well. The light emitting element 101B and the light receiving element 103B may be provided on the board 13 or may be provided separately from the board 13.

The optical cable 9 has a plurality of optical fibers 19. Each optical fiber 19 only has to have a core and a cladding as is well known. Each optical fiber 19 may have a coating film according to need. The plurality of optical fibers 19 may be covered by a sheath and bundled at the outside of the plug 11 or need not be bundled. The optical cable 9 is not limited to a cable shaped one. For example, a film-shaped one having a core and cladding may be used as well. The plurality of optical fibers 19 are for example arranged in a line in the width direction (y-direction) of the plug 11 in at least the internal portion of the plug 11.

The plug 11 has for example a base part 11a, second insertion part 11b which projects from the base part 11a to the front end side, and a first insertion part 11c which projects from the second insertion part 11b to the front end side. Each of the base part 11a, second insertion part 11b, and first insertion part 11c is for example formed in roughly box shapes. Further, in at least one (preferably both) of the width direction (y-direction) and the height direction (z-direction), the second insertion part 11b is smaller than the base part 11a, and the first insertion part 11c is smaller than the second insertion part 11b.

The optical cable 9 is inserted into the base part 11a, second insertion part 11b, and first insertion part 11c. One end of the optical cable 9 is exposed from the front end of the first insertion part 11c, and the other end side extends from the base part 11a. Further, in the plug 11, the second insertion part 11b and first insertion part 11c is inserted into the receptacle 17, thereby one end of the optical cable 9 is connected to the end part of the optical waveguide strip 15 which is exposed in the internal portion of the receptacle 17.

The board 13 is configured by for example a rigid printed circuit board. The board 13 is for example formed in a flat plate shape and has a first major surface 13a, a second major surface (notation omitted) on the back thereof, and an outer circumferential surface (notation omitted) facing the peripheral side of these major surfaces. A portion in the outer circumferential surface becomes the end face 13c facing the plug 11 side. The end face 13c is for example formed in a straight shape over at least a range of arrangement of the receptacle 17 when viewing the board 13 on a plane (the end face 13c is formed in a flat surface shape).

The optical waveguide strip 15 is provided on the first major surface 13a of the board 13. The optical waveguide strip 15 has a plurality of optical waveguides 21. Each optical waveguide 21, as is well known, has a configuration the same as that of an optical fiber and has a not shown core and cladding. Note that, the optical waveguide 21 may be a slab type, embedded type, half-embedded type, or other suitable type. In FIG. 1, each optical waveguide 21 is indicated by a solid line. In actuality, however, it may not be visually recognizable due to a coating film or the like. The end face of the optical waveguide 21 is exposed on the end face 13c side (see FIG. 3). The plurality of optical waveguides 21 are arranged in a line in a direction along the end face 13c (y-direction) on at least the end face exposed from the end face 13c side.

Figure 2:
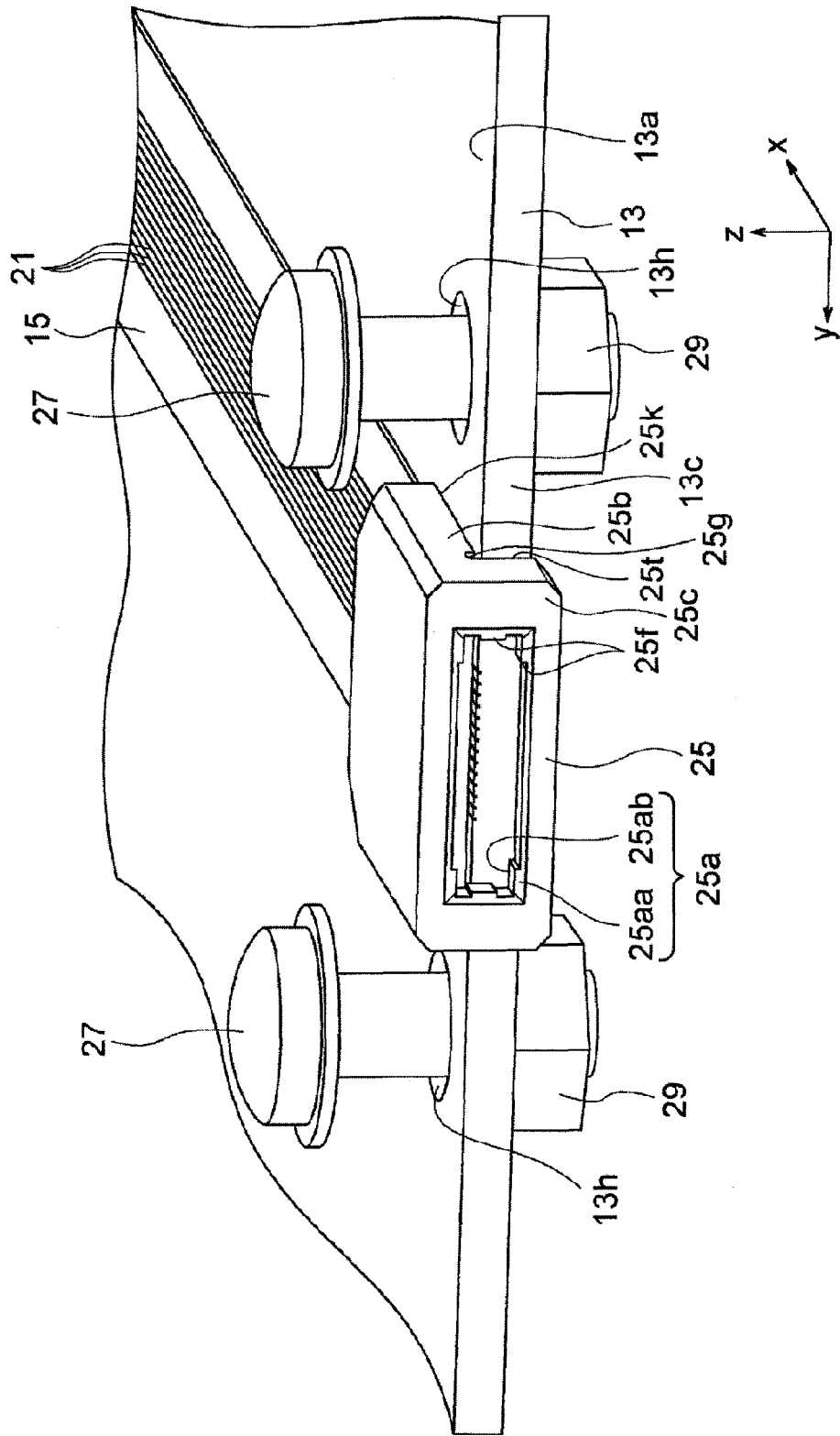
FIG. 2 is a perspective view which shows a portion of a receptacle assembly of the optical transmission module in FIG. 1.
Figure 3:
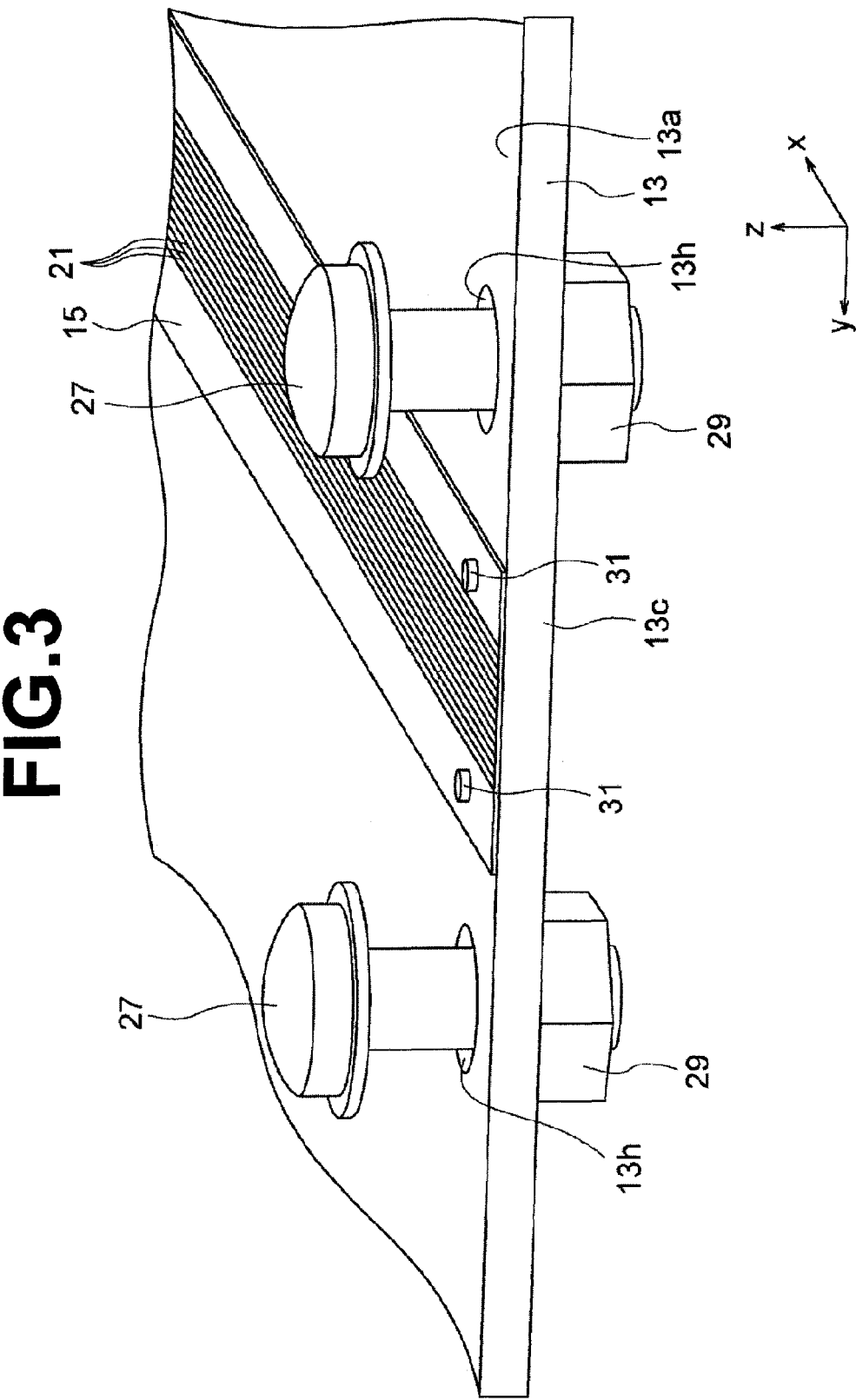
FIG. 3 is a perspective view which shows a board of the receptacle assembly in FIG. 2.

FIG. 2 is a perspective view of a receptacle assembly 7 which shows a portion (fastening member 23) of the receptacle 17 detached, while FIG. 3 is a perspective view showing another portion (positioning member 25) of the receptacle 17 detached.

As shown in FIG. 1 to FIG. 3, the receptacle 17 has the two members of the fastening member 23 (FIG. 1) and positioning member 25 (FIG. 2). The fastening member 23 is fastened to the board 13 by bolts 27 and nuts 29 and fastens the positioning member 25. The positioning member 25 has a first opening 25a (FIG. 2) in which the first insertion part 11c of the plug 11 is fit and positions the plug 11 in its width direction (y-direction) and height direction (z-direction).

In this way, in the present embodiment, the receptacle 17 is not integrally formed as a whole. The fastening member 23 which contributes to fastening of the board 13 and the positioning member 25 which contributes to the positioning of the plug 11 are separately formed. Accordingly, for example, the volume which is used for the fastening of the bolts 27 and the nuts 29 is sufficiently secured in the fastening member 23. On the other hand, the positioning member 25 is made small in size to facilitate its high precision formation and to make the thermal deformation small, so the positioning accuracy can be made high. The specific configurations of these members are as follows.

Figure 4:
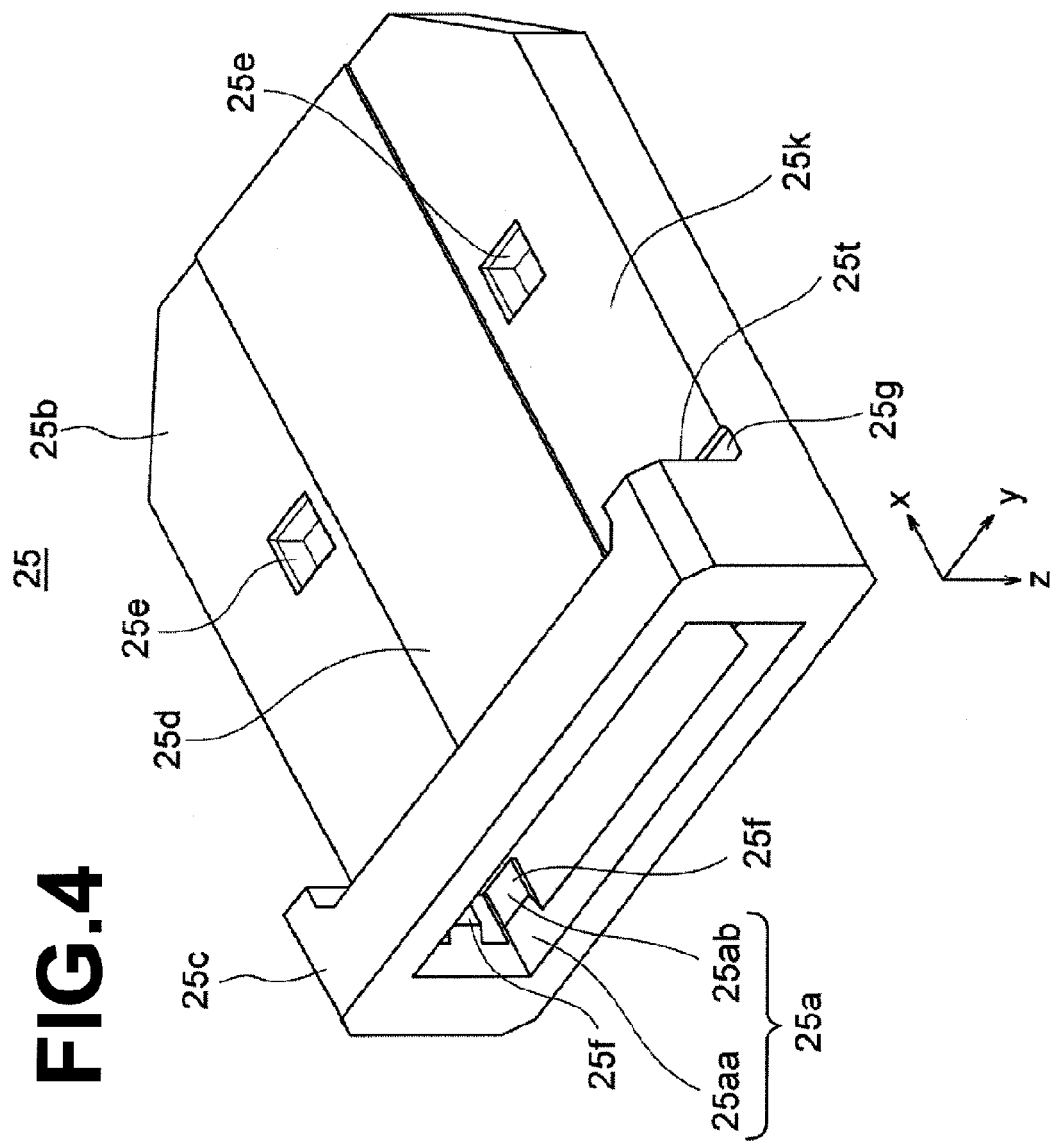
FIG. 4 is a perspective view when viewing a positioning member of the receptacle assembly in FIG. 2 from the lower side.
Figure 5:
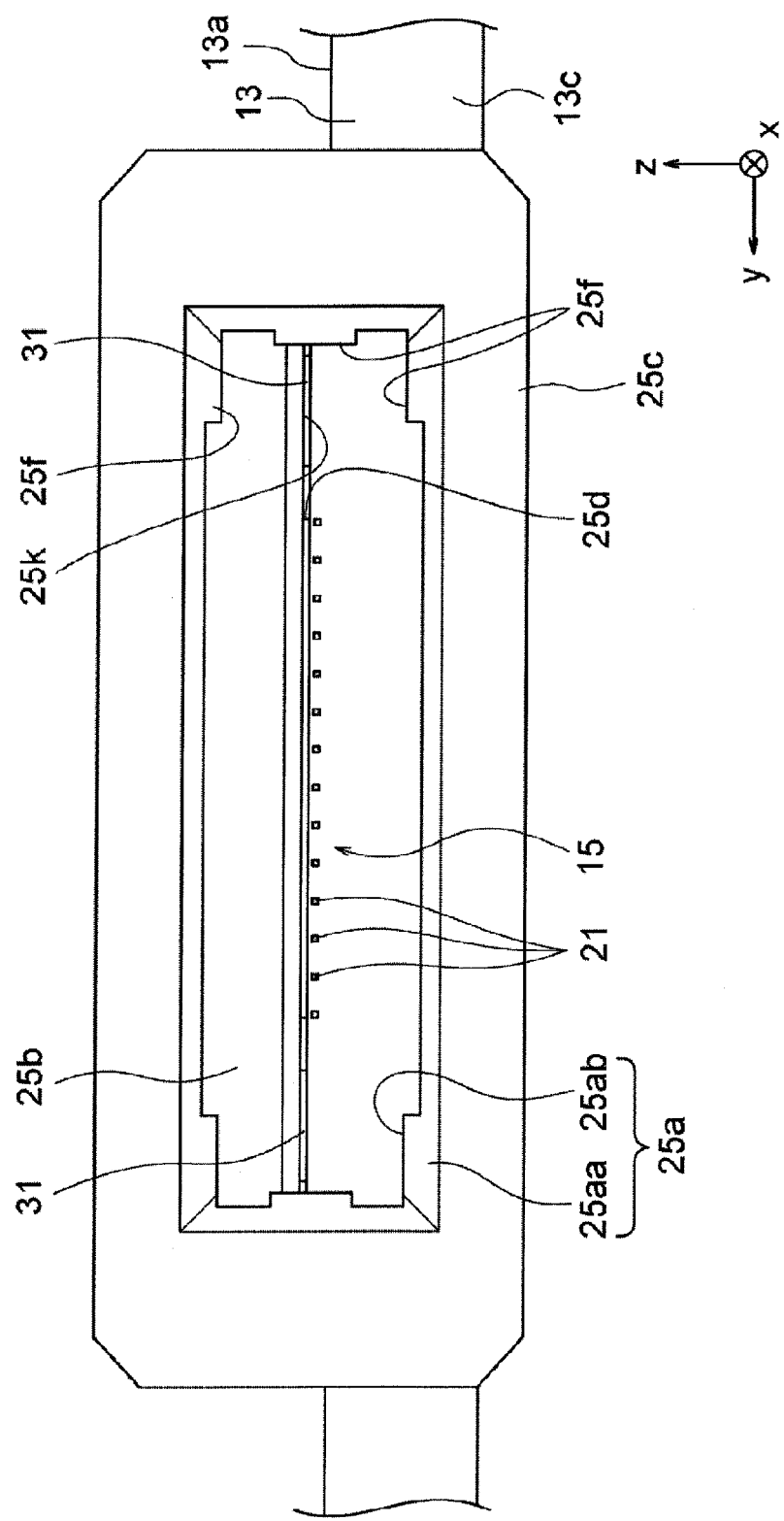
FIG. 5 is a front view which shows the positioning member in FIG. 4 in a state where it is arranged on the board.

FIG. 4 is a perspective view which views the positioning member 25 from the lower side. FIG. 5 is a front view which shows the positioning member 25 in a state where it is arranged on the board 13.

The positioning member 25 which is shown in FIG. 2, FIG. 4, and FIG. 5 is for example comprised of an integrally molded plastic or ceramic. The positioning member 25 has a base 25b which is arranged on the first major surface 13a of the board 13 and an opening component 25c which is positioned on the end face 13c of the board 13 and forms a first opening 25a.

The base 25b is for example formed in a roughly plate shape and is superimposed on the first major surface 13a of the board 13. Due to this, the positioning member 25 is positioned in the height direction (z-direction) relative to the optical waveguides 21 provided on the board 13.

In more detail, as shown in FIG. 4 and FIG. 5, in the base 25b, on a lower surface 25k which faces the board 13, a first region which is superimposed on the plurality of optical waveguides 21 may rise up to the board 13 side compared with a second region which is not superimposed on the plurality of optical waveguides 21. That is, on the base 25b, a raised portion 25d which rises up to the board 13 side is formed. The top face of the raised portion 25d is for example a flat surface. The height of the raised portion 25d may be suitably set. Further, by arranging the positioning member 25 so that the raised portion 25d abuts against the optical waveguide strip 15, the positioning member 25 can be positioned relative to the optical waveguides 21 in the height direction with a high accuracy.

Further, on the base 25b, as shown in FIG. 4, recessed hole portions 25e (may be through holes as well) are formed in the lower surface 25k. On the other hand, as shown in FIG. 3, on the first major surface 13a, projections 31 are provided. Accordingly, by fitting the projections 31 in the hole portions 25e, the positioning member 25 is positioned in the width direction (y-direction) relative to the board 13 (optical waveguides 21).

In more detail, for example two hole portions 25e are provided so as to sandwich the region (raised portion 25d) facing the optical waveguides 21 there between. Further, the hole portions 25e are for example given rectangular shapes in the cross-sections which are parallel to the xy plane. On the other hand, the projections 31 are for example given circular shapes in the cross-sections which are parallel to the xy plane. Accordingly, the projections 31 and the hole portions 25e do not contact each other surfaces over their entire circumferences, but are positioned by partial contact at a plurality of positions (theoretically point contact).

Note that, the hole portions 25e may be given regular square shapes and position the projections 31 in both of the x-direction and y-direction or may be given rectangular shapes which are long in the x-direction and position the projections 31 in only the y-direction.

The projections 31 may be formed by plastic, metal, ceramics, or other suitable materials. Further, the projections 31 may be fastened to the board 13 by a suitable method such as fastening by an adhesive or welding to the board 13.

The opening component 25c is formed so as to form a frame shape which projects in the direction perpendicular to the base 25b. In a case where the above-explained projections 31 and hole portions 25e perform positioning in only the y-direction, the opening component 25c abuts against the end face 13c of the board 13, whereby the positioning member 25 is positioned in the insertion direction (x-direction) with respect to the board 13 (optical waveguides 21). Note that, it may be positioned in the x-direction by the projections 31 and hole portions 25e as well.

The first opening 25e has a first guide portion 25aa which configures an inlet of the first opening 25e and first fitting portion 25ab on the back side of the first guide portion 25aa.

The first fitting portion 25ab is the portion in which the front end of the first insertion part 11c of the plug 11 is fit, and contributes to the positioning of the plug 11. On the other hand, the first guide portion 25aa continues from the inlet side of the first fitting portion 25ab and is formed so as to become broader in the diameter direction the further toward the inlet side, and contributes to facilitating fitting of the first insertion part 11c into the first fitting portion 25ab. Note that, the inclined surfaces of the first guide portion 25aa from the inlet side to the back side may be flat surfaces in shape or may be curved surfaces in shape. Further, their inclination angles may be suitably set. That is, the sliding ability when the plug 11 is inserted may be adjusted by the inclination angle.

On the inner circumferential surface of the first opening 25a (mainly first fitting portion 25ab), a plurality of projections 25f are formed. Further, the first insertion part 11c of the plug 11 is positioned by abutment of the plurality of projections 25f against its periphery. That is, the first insertion part 11c and the first fitting portion 25ab are positioned not by surface contact over the entire circumference thereof, but by partial contact at the plurality of positions surrounding the first insertion part 11c.

The plurality of projections 25f are provided, for example, at the two sides in the width direction (y-direction) of the first opening 25a at the side surfaces, the upper surface, and the lower surface. Six are provided in total (FIG. 2 and FIG. 5). On the cross-section perpendicular to the insertion direction (x-direction), the ratio of the inner circumference of the first opening 25a which the plurality of projections 25f occupy is for example less than a half and preferably less than ⅓. By setting the ratio of the inner circumference which is occupied in this way, the sliding friction when inserting the plug 11 is reduced, and the stability of the insertion state can be improved. Further, at each projection 25f, for example, the top face is formed as a flat surface and contacts the first insertion part 11c by surface contact. Note that the top face may be formed as a curved surface or the like as well.

The plurality of projections 25f are mainly provided in the first fitting portion 25ab, but a portion thereof are positioned in the first guide portion 25aa as well and configure portions of the inclined surfaces of the first guide portion 25aa (FIG. 2 and FIG. 4). Accordingly, the first insertion part 11c is smoothly guided to the top faces of the projections 25f. Note that, the projections 25f may be formed so as to extend up to the edge part on the inlet side of the first guide portion 25aa, and the inclined surfaces of the first guide portion 25aa may be formed only by the projections 25f as well.

Figure 7:
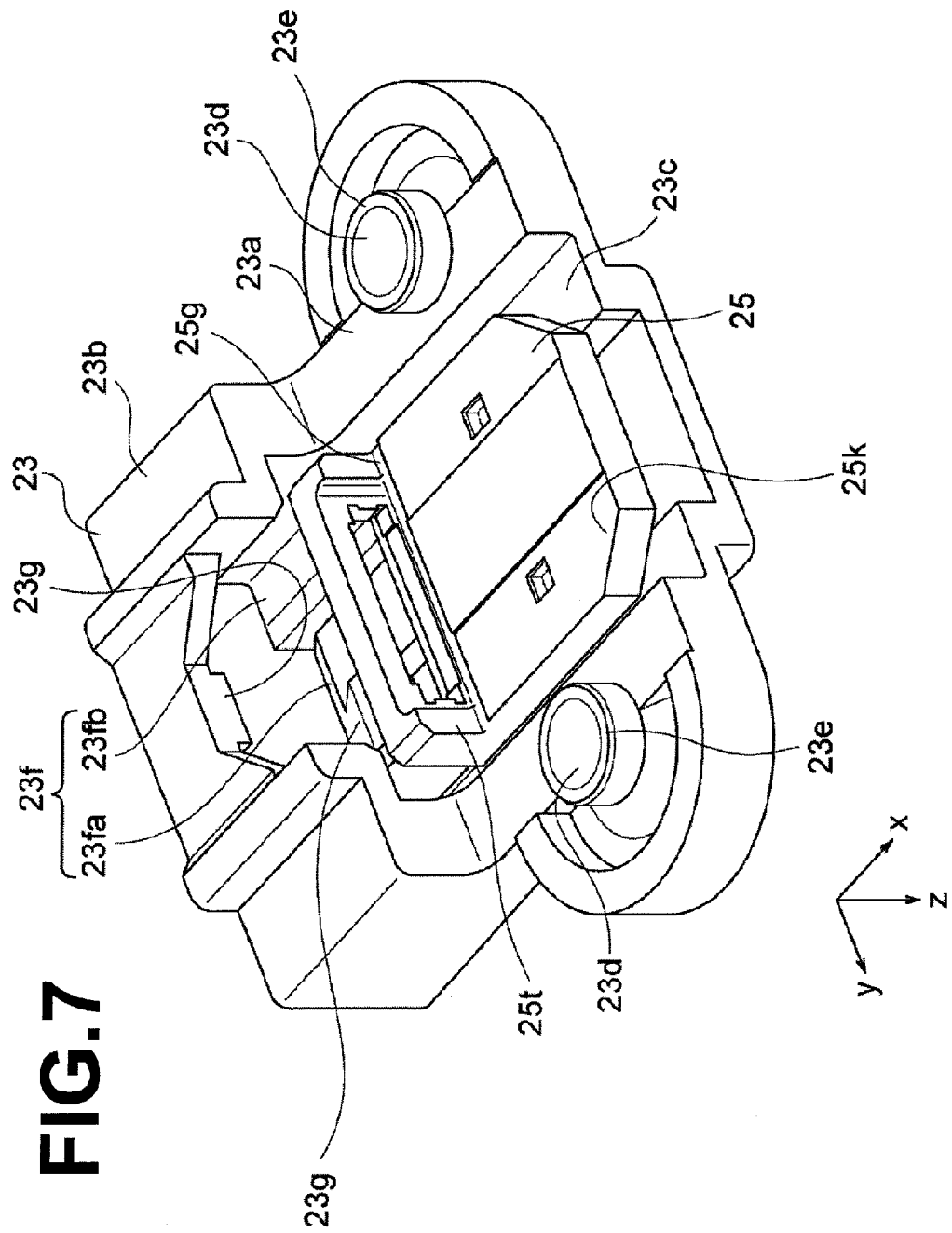
FIG. 7 is a perspective view which shows the fastening member in FIG. 6 in a state where it is held upon the positioning member.

As shown in FIG. 2 and FIG. 4, in the lower surface 25k of the base 25b at the edge of the opening component 25c which is formed together with the rear face 25t facing the board 13 side, a clearance groove 25g which extends along the edge (extends in the y-direction) is formed (see FIG. 7 too). The clearance groove 25g for example extends over the entire the base 25b in the width direction. The cross-sectional shape and dimension of the clearance groove 25g may be suitably set. By the clearance groove 25g, the edge formed by the first major surface 13a and the end face 13c of the board 13 does not easily influence the positioning of the board 13 and the positioning member 25.

Figure 6:
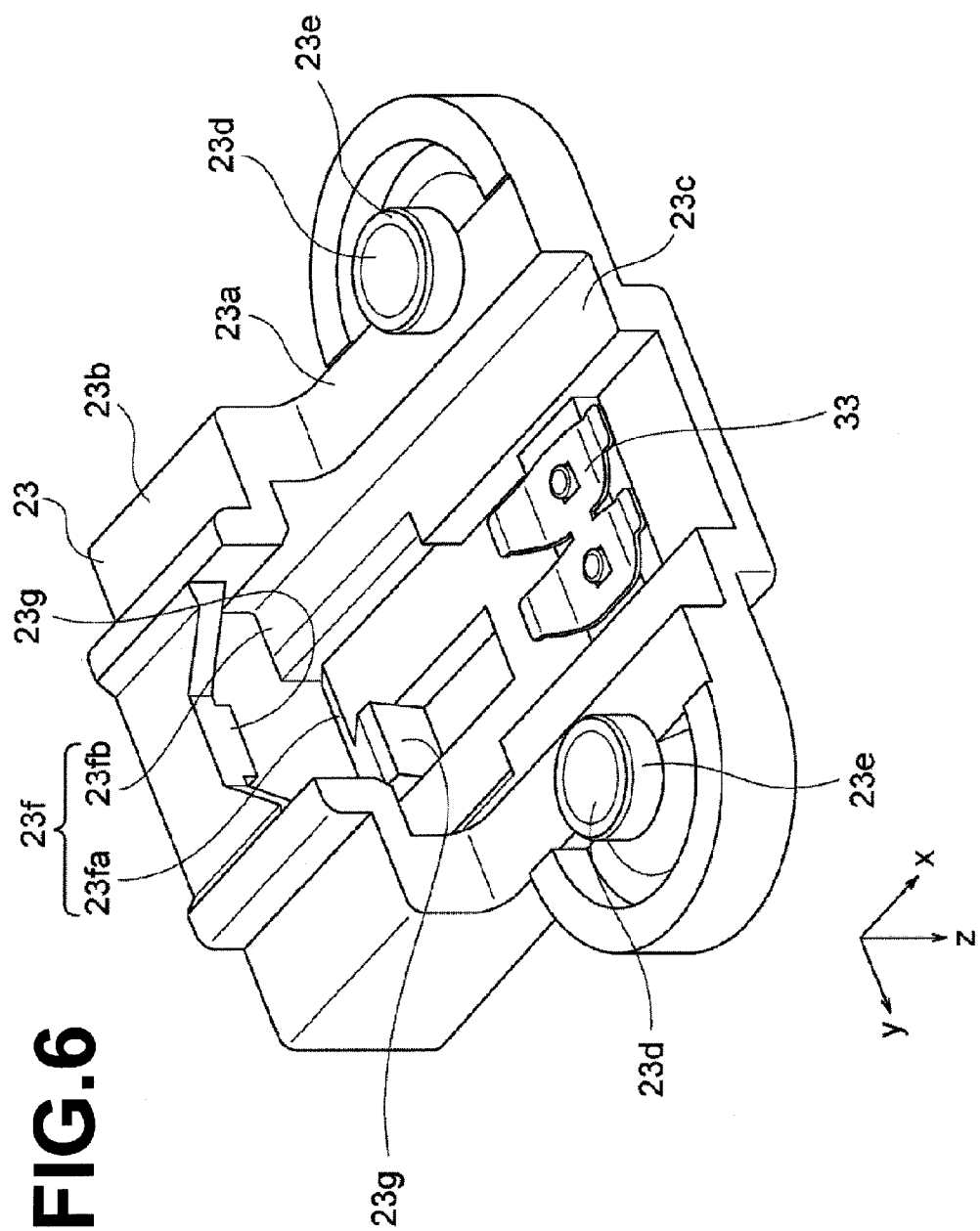
FIG. 6 is a perspective view when viewing a fastening member of the receptacle assembly in FIG. 2 from the lower side.

FIG. 6 is a perspective view when viewing the fastening member 23 from the lower side. FIG. 7 is a perspective view when viewing the fastening member 23 in a state where it holds the positioning member 25 from the lower side.

The fastening member 23 shown in FIG. 1, FIG. 6, and FIG. 7 is for example comprised of integrally molded plastic or ceramic. Note that, the optical cable 9 and the optical waveguide strip 15 are positioned by the positioning of the plug 11 and the positioning member 25. Therefore, compared with the positioning member 25, it is not necessary to shape the fastening member 23 with a high accuracy. For the same reason, as the material for the fastening member 23, compared with the material for the positioning member 25, one having a higher thermal expansion coefficient can be selected.

The fastening member 23 for example has a main part 23a which mainly contributes to fastening of the fastening member 23 with respect to the board 13 and to holding of the positioning member 25 and has an auxiliary part 23b which mainly contributes to the insertion and holding of the plug 11.

The main part 23a is for example formed to a generally thin shape and is arranged on the first major surface 13a of the board 13 from the top of the positioning member 25. Further, by fastening the main part 23a to the board 13 by the bolts 27 and nuts 29, it pushes the positioning member 25 against the board 13 and restricts the movement of the positioning member 25 (particularly movement to positive side of z-direction).

In more detail, as shown in FIG. 6, between the main part 23a and the positioning member 25, a plate spring 33 is arranged. Further, the main part 23a pushes the positioning member 25 against the board 13 side through the plate spring 33.

Further, as shown in FIG. 6 and FIG. 7, the main part 23a has a recessed portion 23c which can hold the positioning member 25 therein in the surface on the side of the first major surface 13a of the board 13. Further, the main part 23a abuts against the first major surface 13a in a state where the positioning member 25 is positioned between the main part 23a and the first major surface 13a. The hole portions 23d into which the bolts 27 are inserted are formed in portions in the main part 23a which abut against the first major surface 13a.

Accordingly, when the bolts 27 and the nuts 29 are fastened and the main part 23a abuts against the board 13, the force of the main part 23a pushing the positioning member 25 against the board 13 is defined not by the fastening force of the bolts 27 and nuts 29, but by the resilience of the plate spring 33.

The recessed portion 23c of the main part 23a is formed so that the main part 23a does not abut against the positioning member 25 in the xy-directions. For example, the main part 23a does not have a wall portion which is positioned in the insertion direction (x-direction) with respect to the recessed portion 23c. Further, in the width direction (y-direction), the recessed portion 23c is sufficiently larger than the positioning member 25. That is, play between the positioning member 25 and the recessed portion 23c is sufficiently large. Accordingly, attachment error of the fastening member 23 with respect to the board 13 in the xy-directions does not easily influence the positioning of the positioning member 25 in the xy-directions with respect to the board 13.

The hole portions 23d of the main part 23a are arranged in a suitable number and at suitable positions. For example, two hole portions 23d are provided in the width direction while sandwiching the positioning member 25 therebetween. Note that, a portion of the hole portions 23d on the board 13 side are configured by cylindrical portions 23e fit in the hole portions 13h (FIG. 3) of the board 13 into which the bolts 27 are to be inserted. The cylindrical portions 23e facilitate the attachment of the fastening member 23 to the board 13.

The plate spring 33 is configured by for example a single metal sheet. Further, the plate spring 33 is for example formed into a curved shape. Its recessed side is arranged on the positioning member 25 side. Accordingly, the plate spring 33 abuts at its central region against the fastening member 23 and abuts at its two ends against the positioning member 25. Further, in the plate spring 33, notches are formed in the two ends abutting against the positioning member 25, therefore it substantially functions as two plate springs. Accordingly, the plate spring 33 biases the positioning member 25 at the four end parts in total. As a result, the plate spring 33 can bias the positioning member 25 with a good balance.

The plate spring 33, for example, is formed with two or more hole portions are formed at its center and is positioned with respect to the fastening member 23 in the xy-directions by the projections which are formed on the fastening member 23 being fit in the hole portions. Note that, the plate spring 33 may be further fastened to the fastening member 23 by an adhesive or the like as well.

The bolts 27 and nuts 29 are comprised of for example metal. The bolts 27 are inserted from the fastening member 23 side to the board 13 side into the members and are screwed with the nuts 29. Note that, the insertion direction of the bolts 27 may be the reverse as well. Further, in the bolts 27 and nuts 29, washers may be suitably arranged. Note that, the outer shape or hole of the bolt head for rotating a bolt 27 by a tool may be a known suitable one.

In the case of the present embodiment, the positioning member 25 contributing to the optical positioning and the fastening member 23 for fastening the positioning member 25 are separated, therefore movement of the positioning member 25 when the fastening member 23 is fastened by the bolts 27 and nuts 29 is suppressed.

The auxiliary part 23b of the fastening member 23 is for example formed in a cylindrical shape which have a second opening 23f formed in the insertion direction (x-direction). The second opening 23f is positioned in front of the first opening 25a of the positioning member 25.

Accordingly, when the plug 11 is inserted into the receptacle 17, the first insertion part 11c of the plug 11 is fit in the first opening 25a after passing through the second opening 23f. Further, when the first insertion part 11c is fit in the first opening 25a, the second insertion part 11b is fit in the second opening 23f.

By fitting the second insertion part 11b in the second opening 23f, the base part 11a and the second insertion part 11b are supported by the fastening member 23, and consequently the load of the optical cable 9 and the load which is applied to the optical cable 9 etc. from the outside are supported by the fastening member 23.

Note that, as will be explained later, the second insertion part 11b and the first insertion part 11c are configured by different members and can move relative to each other within a predetermined range. Accordingly, positioning of the second insertion part 11b by fitting it in the second opening 23f does not exert an influence upon the positioning of the first insertion part 11c and the first opening 25a.

The second opening 23f, as shown in FIG. 1, in the same way as the first opening 25a, has second guide portion 23fa configuring the inlet of the second opening 23f and second fitting portion 23fb on the back side of the second guide portion 23fa.

The second fitting portion 23fb is portion in which the second insertion part 11b of the plug 11 is fit and contributes to the above-explained load support. On the other hand, the second guide portion 23fa is portion which continues from the inlet side of the second fitting portion 23fb and is formed so that they become broader the further toward the inlet side in the abutment direction, and contribute to facilitating fitting of the plug 11 in the second guide portion 23fb. Note that, the inclined surfaces of the second guide portion 23fa from the inlet side to the back side may be flat surfaces in shape or may be curved surfaces in shape. Their inclination angles may be suitably set.

Further, the auxiliary part 23b of the fastening member 23 may be provided with projection shaped engagement portions 23g as well. By provision of the engagement portions 23g in this way, when the plug 11 is inserted, the engagement portion 23g of the fastening member 23 and the engaged portion 11d of the plug 11 are engaged.

Figure 8:
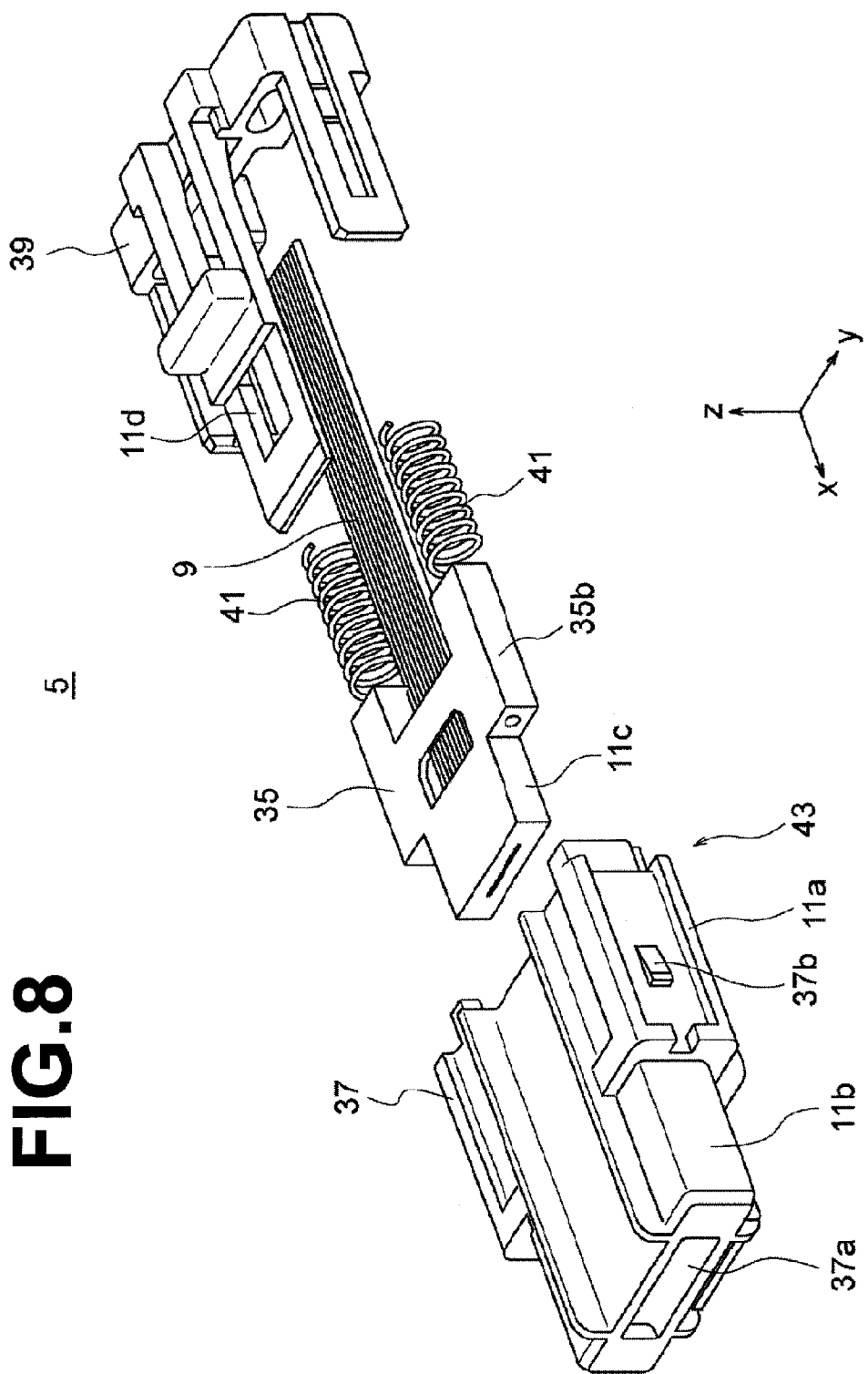
FIG. 8 is a disassembled perspective view which shows a plug assembly of the optical transmission module in FIG. 1.

FIG. 8 is a disassembled perspective view of the plug assembly 5.

The plug 11 for example has a positionable member 35 which mainly configures the first insertion part 11c, an outer side member 37 and engagement member 39 which mainly configure the second insertion part 11b and base part 11a, and coil springs 41 which are interposed between them. Note that, the combination of the outer side member 37 and engagement member 39 will be sometimes referred to as the "holding member 43".

The positionable member 35 holds the end part of the optical cable 9. The outer side member 37 and engagement member 39 are fastened to each other to configure the holding member 43 and hold the positionable member 35 so as to be movable within a predetermined range of play in the width direction (y-direction) and height direction (z-direction). Accordingly, as already explained, the influence of the positioning and supporting of the second insertion part 11b in the yz-directions by the fastening member 23 exerted upon the positioning of the first insertion part 11c and the positioning member 25 in the yz-directions is reduced.

In more detail, for example, the positionable member 35 is formed in a roughly plate shape as a whole, and has a first insertion part 11c and a holdable part 35b which is broader than the first insertion part 11c. On the other hand, the outer side member 37 is formed in a box shape which is capable of holding the holdable part 35b from the base side (negative side of the x-direction) and has an opening 37a formed therein through which the first insertion part 11c projects.

Further, the engagement member 39 is fastened to the outer side member 37 by engagement with hook portions 37b etc. of the outer side member 37 in a state where the opening on the base side in the outer side member 37 is closed. Further, the holding space in the holding member 43 is formed slightly larger than the holdable part 35b, and the opening 37a is formed slightly larger than the first insertion part 11c as well. Due to this, the positionable member 35 moves relative to the holding member 43 within a range of play in the yz-directions. Further, the engagement member 39 is provided with an engaged portion 11d which is engaged with the engagement portion 23g of the fastening member 23. The engaged portion 11d may be a through hole or recessed portion.

FIG. 9 is a view which shows the positioning member 25 and positionable member 35 while omitting the fastening member 23 and holding member 43 etc. in the optical transmission module 1 in the connected state.

The plug 11 optically connects the optical cable 9 to the optical waveguide strip 15 by contact with the positioning member 25. More specifically, in the optical transmission module 1, the positionable member 35 (first insertion part 11c) is fit in the first opening 25a of the positioning member 25. At this time, as will be understood from FIG. 9, the positioning of the positionable member 35 in the insertion direction (x-direction) is achieved by abutment of the front end face of the first insertion part 11c against the end face 13c of the board 13.

On the other hand, as will be understood from FIG. 1 etc., the positioning of the holding member 43 in the insertion direction is achieved by abutment of the portion of the base part 11a which expands to the outer side compared with the second insertion part 11b against the portion around the second opening 23f in the fastening member 23.

Here, the positionable member 35 and the holding member 43 are made movable relative to each other in the insertion direction as well in the same way as the yz-directions. That is, the influence of the positioning of the holding member 43 in the insertion direction exerted upon the positioning of the positionable member 35 in the insertion direction is reduced.

In more detail, for example, the holding space in the holding member 43 is made larger than the holdable part 35b of the positionable member 35 in the insertion direction (x-direction) as well. Due to this, the positionable member 35 can move in the insertion direction relative to the holding member 43. Note that, this movement may be set relatively large compared with the play in the yz-directions.

The coil springs 41 shown in FIG. 8 are for example configured by winding wire materials formed by metal around axes which are parallel to the insertion direction. The coil springs 41 are for example inserted into the outer side member 37 from the back of the outer side member 37 so as to continue the positionable member 35 and are interposed between the engagement member 39 and the engaged portion 35b of the positionable member 35. For example two coil springs 41 are provided on the two sides in the width direction of the optical cable 9. By the provision of the coil springs 41 on the two sides in the width direction of the optical cable 9 in this way, variation of the biasing force of the coil springs 41 in the width direction of the optical cable 9 can be suppressed.

Accordingly, the positionable member 35 is biased forward with respect to the holding member 43 by the resilience of the coil springs 41. Further, the plug 11 is inserted into the receptacle 17 and is inserted into the first opening 25a of the positioning member 25. At this time, by engagement of the engagement portion 23g of the fastening member 23 and the engaged portion 11d of the plug 11, the engagement member 39 presses the holding member 43 forward through the coil springs 41. That is, according to the relative positional relationship between the engagement portion 23g of the fastening member 23 and the engaged portion 11d of the plug 11 and the resilience of the coil springs 41, contact pressure between the front end face of the positionable member 35 and the end face 13c of the board 13 after insertion can be adjusted.

Note that, the coil springs 41 may be interposed between the positionable member 35 and the holding member 43 in a compressed state to a certain extent even when the positionable member 35 is positioned at the front most position with respect to the holding member 43 (even at the time when the plug 11 is not inserted in the receptacle 17). In this case, the positionable member 35 can be pushed against the board 13 more reliably. Further, the ratio of the amount of fluctuation of the contact pressure due to fluctuation of the relative positions of the positionable member 35 and the holding member 43 can be made small as well.

As described above, in the present embodiment, the optical connector 3 has the receptacle 17 which is fastened to the board 13 provided with the optical waveguides 21 and has the plug 11 which holds the optical fibers 19 and is connected to the receptacle 17. The receptacle 17 has the fastening member 23 which is fastened to the board 13 and has the positioning member 25 which is held by the fastening member 23 and performs positioning of the optical waveguides 21 and the optical fibers 19 by abutment against the plug 11.

Accordingly, as already explained, for example, it is possible to secure enough volume in the fastening member 23 so as to make the fastening of the receptacle 17 to the board 13 firm or easy while possible to make the positioning member 25 small in size to make its high precision formation easy or make the thermal deformation small to thereby make the positioning accuracy high. That is, it is possible to individually consider both of the scale effect relating to the fastening of the receptacle 17 and the scale effect relating to the positioning of the optical transmission line in the design. As a result, suitable fastening of the connector part to the board and high precision positioning of the optical transmission line can both be achieved.

Further, as a result of obtaining the effects as described above, even in a case where a relatively small optical cable 9 and optical waveguide strip 15 are positioned with a high accuracy, as the method of fastening the receptacle 17 to the board 13, fastening using the bolts 27 and nuts 29 requiring a relatively large volume in the receptacle 17 can be selected. By fastening by tightening is realized, for example, compared with a case where the receptacle 17 is fastened to the board 13 by an adhesive, fastening or exchange of the receptacle 17 is facilitated.

Further, in the present embodiment, the positioning member 25 has the first opening 25a in which the plug 11 is fit in the abutment direction of the optical fibers 19 and the optical waveguides 21.

Accordingly, the positioning member 25 can perform positioning in the directions (yz-directions) perpendicular to the connection direction of the optical transmission line by a simple configuration. In addition, the positioning member 25 surrounds the connection parts of the optical transmission line and therefore can suppress entry of noise into these connection parts or release of noise from these connection parts or can protect the connection parts from dust or water.

Further, in the present embodiment, the inner circumferential surface of the first opening 25a is formed with a plurality of projections 25f which abut against a portion of the outer circumferential surface of the plug 11 and position the plug 11.

Accordingly, for example, improvement of the positioning accuracy or facilitation of the same is achieved. Specifically, for example, it is not necessary to form the positioning member 25 over the entire circumference of the first opening 25a with a high accuracy. It may be highly precisely formed only at the projections 25. Further, the thermal deformation at the parts of the positioning member 25 between the plurality of projections 25f does not directly influence the positioning accuracy. As a result, the positioning accuracy is improved.

Further, by provision of the plurality of projections 25f, the area over which the plug 11 (positionable member 35) and the first opening 25a slide when fitting the plug 11 into the first opening 25a can be made smaller, consequently the sliding friction can be made lower. As a result, for example, insertion of the positionable member 35 into the first opening 25a by utilizing the biasing force of the coil springs 41 is facilitated.

Further, in the present embodiment, the fastening member 23 presses the positioning member 25 against the board 13 through the plate spring 33 and thereby holds the positioning member 25.

Accordingly, direct application of the force for fastening the fastening member 23 to the board 13 to the positioning member 25 is suppressed. As a result, for example, the influence of the fastening of the fastening member 23 to the board 23 exerted upon the positioning of the positioning member 25 relative to the board 13 can be reduced. Further, as the fastening method of the fastening member 23 to the board 13, conclusion capable of generating a strong strength compared with adhesion etc. can be employed.

Further, in the case where the plate spring 33 presses the positioning member 25 against the board 13 at a plurality of positions as in the present embodiment, as already explained, the biasing force of the plate spring 33 is dispersed, therefore the positioning member 25 can be pressed against the board 13 with a good balance.

Further, in the present embodiment, the positioning member 25 has the lower surface 25k (first surface) which faces the first major surface 13a of the board 13 and reaches the end face 13c and has the rear surface 25t (second surface) which intersects the lower surface 25k and contacts the end face 13c of the board 13. The clearance groove 25g is formed at the location (edge) at which the lower surface 25k and the rear face 25t intersect.

Accordingly, as already explained, the edge formed by the first major surface 13a and the end face 13c of the board 13 does not easily influence the positioning of the board 13 and the positioning member 25. As a result, the positioning accuracy can be improved. For example, the board 13 is cut from a mother board (wafer) from which many boards 13 are diced by dicing the mother board. Its cut surface becomes the end face 13c. In this case, by dicing, in the edge formed by the end face 13c and the first major surface 13a, sometimes there is residual uncut material which curls up from the edge to the side facing the first major surface 13a. Further, if the clearance groove 25g is not provided, that residual uncut material becomes interposed between the board 13 and the positioning member 25, therefore the positioning accuracy of the board 13 and the positioning member 25 is liable to be lowered. In the present embodiment, however, the residual uncut material is held in the clearance groove 25g, therefore the influence of the residual uncut material upon the positioning of the positioning member 25 and the board 13 can be reduced.

Further, in the present embodiment, the positioning member 25 has the lower surface 25k (facing surface) facing the first major surface 13a of the board 13. In the lower surface 25k, a first region (raised portion 25d) which is superimposed on the optical waveguides 21 rises up to the first major surface 13a side more than a second region which is not superimposed on the optical waveguides 21, so the raised portion 25d abuts against the upper surface of the optical waveguides 21.

Accordingly, the positioning member 25 does not abut against the board 13 or optical waveguides 21 over the entire lower surface 25k, but selectively abuts against the optical waveguides 21 or board 13. As a result, improvement or facilitation of the positioning accuracy of the optical waveguides 21 and the positioning member 25 can be achieved. For example, in the same way as the effects by the plurality of projections 25f, the portions requiring high precision processing are reduced, the influence of the thermal deformation of portions other than the raised portion 25d upon the positioning is reduced, and so on. Further, the position of the raised portion 25d is made a position that faces the optical waveguides 21, whereby a distance between the raised portion 25d and the optical waveguides 21 is shortened and thus the influence of thermal deformation etc. upon the positioning can be further reduced.

Further, in the present embodiment, the thermal expansion coefficient of the positioning member 25 is lower than the thermal expansion coefficient of the fastening member 23.

This is a setting that becomes possible by reduction of the influence of the fastening member 23 upon the positioning as already explained. By using the positioning member 25 and fastening member 23, the degree of freedom of design can be raised since the materials of the two can be changed in this way. If selecting the materials so as to obtain such a relationship of the thermal expansion coefficients, for example, there is the effect that an expensive material having a low thermal expansion coefficient is used only for the positioning member 25, so the receptacle 17 can be cheaply produced as a whole.

Further, in the present embodiment, the plug 11 has the positionable member 35 which holds the optical fibers 19 and abuts against the positioning member 25 and has the holding member 43 which holds the positionable member 35 so as to be movable within a predetermined range and which is supported upon the fastening member 23.

Accordingly, for example, as already explained, the influence of the load of the fastening member 23, the load applied to the fastening member 23, or the positioning of the fastening member 23 upon the positioning of the positionable member 35 is reduced and application of an excessive load to the positionable member 35 and to the positioning member 25 can be suppressed.

As a result, for example, handling of the plug 11 can be facilitated by increasing the size of the fastening member 23. Further, the necessity of providing a member for supporting the portion of the optical cable 9 which extends from the optical connector 3 at another position can be reduced. Further, the optical cable 9 can be made longer or the width of the optical cable 9 can be made larger. By making the holding member 43 (second insertion part 11b) so as to be firmly fit in the second opening 23f, inadvertent pullout of the plug 11 from the receptacle 17 can be suppressed. Application of a strong force to the connection parts of the optical waveguides 21 and the optical fibers 19 at the time when a user inserts the plug 11 with a strong force can be suppressed.

Further, in the present embodiment, the plug 11 has the coil springs 41 which press the positionable member 35 against the holding member 43 to the optical waveguides 21 side in the abutment direction of the optical waveguides 21 and the optical fibers 19.

Accordingly, for example, as already explained, the positionable member 35 is brought into contact in a state where pressure is applied between the front end face of the positionable member 35 and the end face 13c of the board 13 by utilizing the resilience of the coil springs 31. As a result, it is unnecessary to employ a configuration for pushing the positionable member 35 by hand separately from the holding member 43 such as extension of the rear end of the positionable member 35 from the rear end of the holding member 43 although it is possible to employ a configuration that the positioning of the holding member 43 in the insertion direction does not exert much of an influence upon the positioning of the positionable member 35 in the insertion direction. It can be made harder for a user to unintentionally apply a strong force to the positionable member 35 and for the connection parts of the optical waveguides 21 and the optical fibers 19 to break due to such a configuration of pushing it in by the hand.

Further, in the present embodiment, the board 13 has the projections 31, and the positioning member 25 has the hole portions 25e in which the projections 31 are fit. The projections 31 are circular in shape and the hole portions 25e are rectangular in shape.

Accordingly, as already explained, the positioning member 25 and the board 13 are positioned by point contact of the projections 31 at a plurality of positions with the inner circumferential surfaces of the hole portions 25e. As a result, the demand on the processing accuracy of the projections 31 and the hole portions 25e is eased. For example, if both of the projections 31 and the hole portions 25e were circular, even if machining error occurred in only a part of the circumferences, the projections 31 would no longer fit in the hole portions 25e, but such apprehension is reduced.

Note that, in the above embodiment, the optical waveguides 21 are one example of the first optical transmission line, the board 13 is one example of the base, the receptacle 17 is one example of the first connector part, the optical fibers 19 are one example of the second optical transmission line, the plug 11 is one example of the second connector part, the bolts 27 are one example of the screw, the plate spring 33 is one example of the first elastic member, the lower surface 25k is one example of the first surface and facing surface, the rear face 25t is one example of the second surface, and the coil springs 41 are one example of the second elastic member.

The present invention is not limited to the above embodiment and may be executed in various ways.

The second connector part (plug 11) is not limited to one holding an optical cable. For example, the second connector part, in the same way as the first connector part (receptacle 17), may be one indirectly holding the optical waveguides etc. by fastening to the board or the like. That is, the optical connector may be one connecting the optical transmission lines provided on the boards to each other as well.

The second connector part only have to optically connect the second optical transmission line (optical cable 9) and the first optical transmission line (optical waveguide strip 15) by contact with the positioning member. For example, the end face of the optical cable 9 and the end face of the optical waveguide strip 15 need not contact each other either.

The method of fastening the fastening member to the base is not limited to conclusion using the screws. For example, the fastening member may be fastened to the board by an adhesive or may be fastened to the board by engagement using a hook portion. Further, conclusion using screws is not limited to one using bolts and nuts. For example, a screw inserted through the fastening member may be screwed with a female screw which is formed on a relatively thick base as well.

The fastening member need not have a second opening in which the second connector part (plug 11) is inserted either. In other words, the fastening member need not have a function of guiding the second connector part to the positioning member and/or a function of directly supporting the load of at least a portion of the second connector part either.

The engagement portion 23g and engaged portion 11d only have to have shapes for engagement. They are not limited to a projection and a recessed portion. Further, the engagement portion 23g may be a through hole or recessed portion and the engaged portion 11d may be a projection as well.

The positioning method of the second connector part (plug 11) using the positioning member is not limited to the method of fitting the second connector part in the first opening. For example, a guide shaft may be provided in either of the positioning member or the second connector part, and a hole portion through which the guide shaft is inserted may be provided in the other as well. Further, for example, the positioning member may be a box member which holds the second connector part and is opened in the upper part as well. Also the direction of relative movement of the positioning member and the second connector part is not limited to the abutment direction of the optical transmission lines and may be a direction perpendicular to the abutment direction as well.

In a case where the positioning member is configured so that it has the first opening in which the second connector part is fit, the inner circumferential surface of the first opening need not have the plurality of projections 25f and the portion configuring the inlet of the first opening need not be made broader comparable to the inlet side.

The rest of the shape of the positioning member may be suitably changed. For example, the clearance groove 25g at the edge and the raised portion 25d need not be provided either. Further, the raised portion 25d need not be provided over the entire insertion direction in the positioning member, but may be provided in only the vicinity of the connection parts of the first optical transmission line (optical waveguides 21) as well. Suitable positions of the positioning member may be made thinner as well. For example, a recessed portion may be formed at a suitable position in the upper surface or lower surface of the base 25b as well. In this case, for example, shrinkage cavities at the time of molding can be suppressed or thermal deformation can be reduced, consequently the positioning accuracy is improved.

The positioning of the positioning member to the board may be suitably carried out. Further, in the case where the positioning is carried out using the projections and hole portions as in the embodiment, the hole portions may be provided in the board and the projections may be provided at the positioning member as well. Further, the shapes of the cross-sections perpendicular to the insertion direction may be made the same between the projections and the hole portions. For example, both of the projections and the hole portions may be made circular in shape or the two may be formed rectangular in shape. Further, where the projections and the hole portions do not have the same shapes, the combination may be circular in shape and elliptical in shape or may be regular square shapes and rectangular shapes. In the case where the shapes of these are set so that the projections and the hole portion points contact at a plurality of positions, the combination thereof is not limited to circular shapes and rectangular shapes. For example, a combination of circular shapes and polygonal shapes other than rectangular shapes is also possible.

The first elastic member need not be provided either. Further, the first elastic element is not limited to a plate spring and may be for example a coil spring or may be a plurality of rubber members. Further, the first elastic member need not bias the positioning member at a plurality of positions. For example, the former may bias the latter at one point or on a plane by providing a rubber sheet as the first elastic member.

The positioning or fastening of the first elastic member in the directions (xy-directions) perpendicular to the biasing direction of may be carried out by either of the fastening member or positioning member. Further, the first elastic member may be formed integrally with the fastening member or the positioning member as well. For example, in a case where the fastening member is comprised of a resin, the portion functioning as the plate spring may be formed by resin integrally with the fastening member as well.

In the case where the fastening member does not support the second connector part (does not perform positioning) or the like as described above, the entire second connector part (plug 11) may be integrally formed as well. In the case where the second connector part has the positionable member and the holding member, the second elastic element need not be provided either.

Note that, from the embodiment of the present application, the following invention which does not require that the first connector part (receptacle 17) includes the two members of the positioning member and fastening member can be extracted.

An optical connector which has a first connector part holding a first optical transmission line and has a second connector part which holds a second optical transmission line and is connected to the first connector part, wherein the second connector part has a positionable member which holds the second optical transmission line and abuts against the first connector part and thereby performs positioning of the first optical transmission line and the second optical transmission line and has a holding member which holds the positionable member so as to be movable within a predetermined range.

In the above invention, even if the first connector part does not have the positioning member and fastening member or even if the first connector part has the fastening member, but the fastening member does not support the holding member, for example, the entire second connector part can improve the handing with a certain degree of size, while the portion concerned with the positioning can be made smaller in size and the positioning accuracy can be made higher. Further, the holding member may be supported upon a part other than the first connector part as well.

REFERENCE SIGNS LIST

1. Optical transmission module, 3. Optical connector, 11. Plug (second connector part), 13. Board, 17. Receptacle (first connector part), 19. Optical fiber (second optical transmission line), 21. Optical waveguide (first optical transmission line), 23. Fastening member, and 25. Positioning member.

The invention claimed is:
1. An optical connector, comprising:
  a first connector part which is fastened to a base provided with a first optical transmission line; and
  a second connector part which holds a second optical transmission line and is connected to the first connector part, wherein
  the first connector part comprises:
    a positioning member is on the first optical transmission line, the positioning member which is configured to position the second optical transmission line and optically connects the second optical transmission line with the first optical transmission line, and
    a fastening member which is fastened to the base and fastens the positioning member with respect to the first optical transmission line, and
    a first elastic member arranged between the fastening member and the positioning member, and pressing the positioning member to the base side in a direction perpendicular to the first optical transmission line.
2. The optical connector according to claim 1, wherein:
  the positioning member comprises a first opening in which the second connector part is fit in an abutment direction of the first optical transmission line and the second optical transmission line.
3. The optical connector according to claim 2, wherein:
  an inner circumferential surface of the first opening comprises a plurality of projections, the plurality of projections abutting against a portion of the outer circumferential surface of the second connector part and positioning the second connector part.

4. The optical connector according to claim 2, wherein:
the first opening becomes larger toward an inlet side in the abutment direction.

5. The optical connector according to claim 2, wherein:
the fastening member comprises a guide portion which guides the second connector part to the first opening, and
the guide portion comprises a second opening in which the second connector part is inserted, the second opening becoming broader toward the inlet side in the abutment direction.

6. The optical connector according to claim 1, wherein:
the first connector part comprises a plurality of the first elastic members.

7. An optical transmission module, comprising:
a first optical transmission line;
a base in which the first optical transmission line is provided;
a second optical transmission line;
a first connector part which is fastened to the base; and
a second connector part which holds the second optical transmission line and is connected to the first connector part,
wherein the first connector part comprises:
a positioning member is on the first optical transmission line, the positioning member which is configured to position the second optical transmission line and optically connects the second optical transmission line with the first optical transmission line, and
a fastening member which is fastened to the base and fastens the positioning member with respect to the first optical transmission line, and
a first elastic member arranged between the fastening member and the positioning member, and pressing the positioning member to the base side in a direction perpendicular to the first optical transmission line.

8. The optical connector according to claim 3, wherein:
the first opening becomes larger toward an inlet side in the abutment direction.

9. The optical connector according to claim 3, wherein:
the fastening member comprises a guide portion which guides the second connector part to the first opening, and
the guide portion comprises a second opening in which the second connector part is inserted, the second opening becoming broader toward the inlet side in the abutment direction.

10. The optical connector according to claim 4, wherein:
the fastening member comprises a guide portion which guides the second connector part to the first opening, and
the guide portion comprises a second opening in which the second connector part is inserted, the second opening becoming broader toward the inlet side in the abutment direction.

11. The optical connector according to claim 8, wherein:
the fastening member comprises a guide portion which guides the second connector part to the first opening, and
the guide portion comprises a second opening in which the second connector part is inserted, the second opening becoming broader toward the inlet side in the abutment direction.

12. The optical connector according to claim 2, wherein:
the first connector part comprises a plurality of the first elastic members.

13. The optical connector according to claim 3, wherein:
the first connector part comprises a plurality of the first elastic members.

* * * * *